Figure 1:
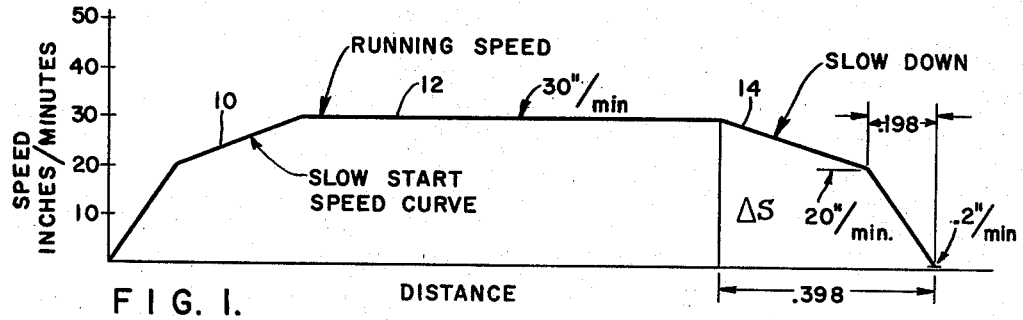

Nov. 12, 1963 T. J. SCUITTO 3,110,865
FEED RATE CONTROL SYSTEM
Filed April 18, 1960 3 Sheets-Sheet 1

INVENTOR.
THOMAS J. SCUITTO
BY
ATTORNEYS.

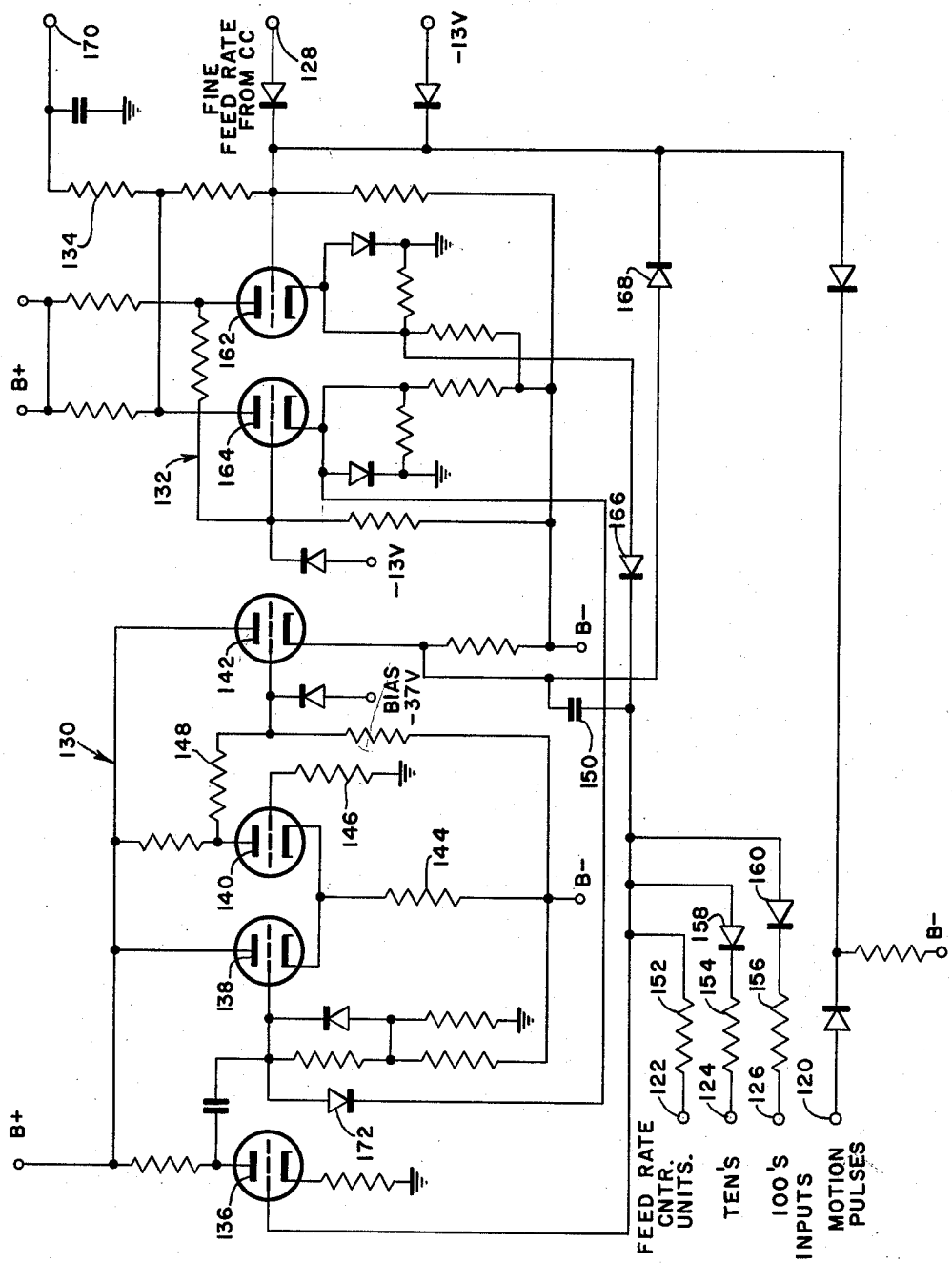

United States Patent Office 3,110,865
Patented Nov. 12, 1963

3,110,865
FEED RATE CONTROL SYSTEM
Thomas J. Scuitto, Santa Monica, Calif., assignor, by mesne assignments, to General Electric Company, a corporation of New York
Filed Apr. 18, 1960, Ser. No. 22,906
8 Claims. (Cl. 328—71)

This invention relates to feed rate control systems for machine tool automation systems, and more particularly to improvements therein.

In a patent by Jack Rosenberg et al. for an Automation System, Patent No. 2,833,941, there is described and claimed an arrangement wherein control pulses, for directing the motion of a cutting tool relative to a work piece to obtain a piece having a desired shape, may be generated from information on a drawing of that shape. These control pulses are stored on a recording medium for a subsequent utilization. In response to each control pulse an increment of motion can occur along one coordinate. Thus a different train of pulses is recorded for each coordinate axis along which it is desired to direct motion. The desired cutting path is achieved by simultaneously applying the control pulses for each axis to direct motion along the various coordinate axes, whereby a resultant motion is obtained which defines the cutting path.

Not only do these control pulses determine the extent of motion along each coordinate, but the number of these control pulses occurring within a given interval (for each coordinate) also determines the speed of motion along the coordinate axis, and thus the resultant speed of execution of the desired cut on the work piece. These control pulses may be recorded on magnetic tape.

The machine tool apparatus includes a tape reader for reading from a separate track on tape for each coordinate axis, the control pulses which were recorded thereon. The pulses thus derived from each track are applied to a reversible counter called an error register. Each error register provides a digital manifestation of its count, which is thereafter converted into an analogue voltage form. This analogue voltage, whose amplitude represents the count of the counter, is applied to a servo motor to drive the machine tool table along the coordinate axis. A motion transducer senses the extent of the motion and provides an output consisting of a pulse for every increment of motion. The motion transducer output is applied to the reversible counter to be subtracted from the count which was entered therein by the command pulses.

The speed at which a machine tool table is driven is determined by the amplitude of the analogue voltage. The amplitude of the analogue voltage is determined by the size of the count in the error register. The higher the frequency of the control pulses being applied to the error register, the larger the count. The larger the count, the larger the analogue voltage and the greater the speed of the motor driven thereby. Where motion simultaneously occurs along two coordinate axes, the resultant speed is the square root of the sum of the squares of the speed along these two axes. Although good machine shop practice demands that the speed at which a cutting operation is executed be kept substantially constant throughout the operation, it is also important to prevent overshoot from occurring at the end of a particular path or at the end of a milling operation. By overshoot is meant that the cutting tool will continue to cut beyond the end of the path due to the fact that the machine tool cannot abruptly stop or abruptly change direction. In manual operation overshoot is avoided by slowing down the speed of the machine tool table as it approaches path ends or direction changes. Thus, in automatic machine tool operation, in order to control or eliminate overshoot, it is desirable to reduce the speed of the operation before reaching the end of a particular path so that the machine tool can be stopped or have its direction changed at the end of that path abruptly without the occurrence of overshoot. Since the control pulse trains which determine speed are derived from a clock pulse oscillator, the speed of operation of the machine tool can be controlled by controlling the frequency of oscillation of the clock pulse oscillator.

An object of the present invention is the provision of a system for eliminating problems of overshoot in automatic machine tool control systems.

Another object of the present invention is the provision of a system for controlling the frequency of an oscillator so that in response to control pulses derived from said oscillator the speed of operation of a machine tool is controlled to eliminate overshoot problems.

Yet another object of the present invention is the provision of a novel, and useful control system which is employed in the preparation of a record from which a machine tool may be controlled in a manner to prevent overshoot.

These and other objects of the present invention may be achieved within an arrangement wherein the frequency of a clock pulse oscillator from which control pulse trains are derived may be gradually increased to a desired frequency for the purpose of gradually bringing a machine tool up to the desired speed of operation, and is gradually reduced when the approach to the end of a path is recognized whereby the speed of the machine is gradually slowed down to a value at which it can be stopped at the end of the path without any overshoot.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which FIGURE 1 shows a curve representative of the velocity of a machine tool versus the distance travelled during a cutting operation, FIGURES 2, 2A and 2B are block schematic diagrams of an embodiment of the invention, and FIGURE 3 is a circuit diagram of a pulse rate discriminator which may be employed with this invention.

In an application for a frequency control system by this inventor, Serial No. 610,730, filing date Sept. 19, 1956, now Patent 2,927,735, there is described the frequency control system which is made a part of the machine tool system described in the patent to Rosenberg et al., Patent No. 2,833,941. This frequency control system operates by generating an analogue representation of the resultant speed of the motion along a path which is obtained in response to two trains of pulses which direct motion along two separate coordinate paths. The two trains of pulses are derived from a clock pulse oscillator employed with the system. The frequency of this clock pulse oscillator is continuously controlled by this analogue quantity in a manner so that the analogue quantity which is derived from the trains of pulses which, in turn are derived from the oscillator, is maintained substantially constant. The present invention provides circuitry which modifies the operation of this speed control system so that the requisite alterations of a clock pulse oscillator frequency is varied to gradually raise this frequency at the beginning of a cutting path and to gradually lower this frequency at the termination of the cutting path.

Figure 2A:
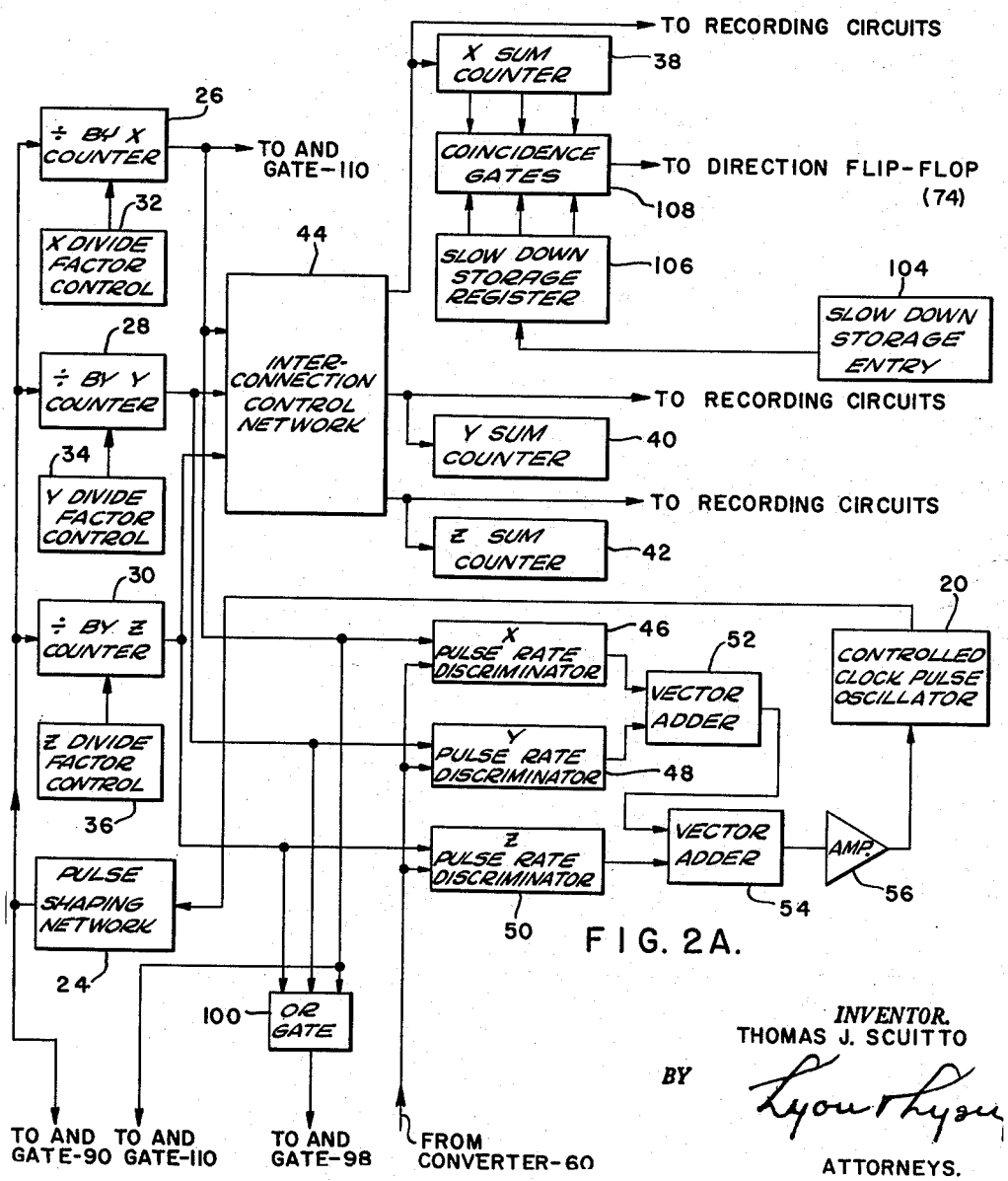
Figure 2B:
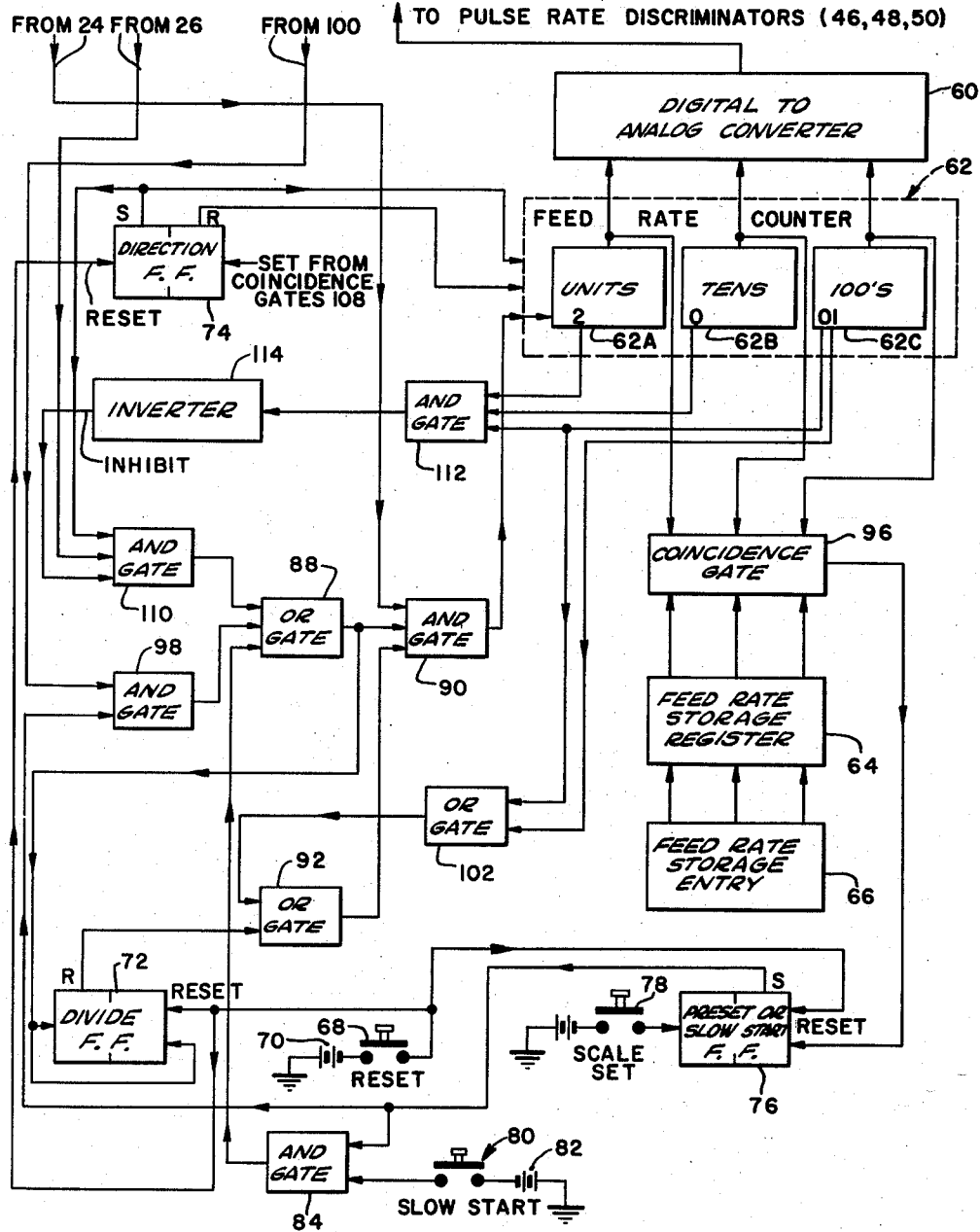

Referring now to FIGURE 1, by way of exemplification there is shown a curve of velocity versus distance travelled during the cut of a machine tool. The curve represents an ideal desired case. Since in the control system described in the patent Rosenberg et al., a number of servo-loop arrangements are entailed, it is desirable to change velocities so that very little or no servo transients should occur. Thus, if a cut is to be made at high speed, then the maximum feed rate should be obtained over an interval which is long enough to insure that minimal servo transients should occur. The slow start speed curve 10 as shown gradually rises from a 0 speed value with distance until, by way of example, a 30 inch per minute running speed is obtained. The running speed represented by the section of the curve 12 takes place over much of the cut until before the end as represented by the curve section 14, the feed rate is gradually dropped to a minimum of for example 2/10 of an inch per minute, at which feed rate stopping or changing directions can occur with a minimum of servo transients. Too abrupt a dropping of the feed rate results in an overshoot in view of the fact that for a coordinated cut different axes cannot be depended upon to respond identically during the transient which occurs with abrupt alterations of the feed rate.

The curve shown in FIGURE 1 shows that in the slowdown made, the velocity change is more or less linear with the distance $\Delta S$ at the end of the cut during the slowdown portion. The rate of change of velocity is such that very little servo transients occur, and thus, work piece gouging even during a coordinated inside cut, slowing down some 100 inches per minute is held to a minimum. For proper operation the feed rate has to be tied directly and accurately to the distance before the end of the cut $\Delta S$. This requirement necessitates that the quantity $\Delta S$ be handled digitally and then converted to a signal to control the feed rate. How this can be done will be described in connection with FIGURE 2.

Some actual data is shown in FIGURE 1 to illustrate typical conditions met in the operation of a machine. The running speed is 30 inches per minute. For this machine $\Delta S$ is set at .398 inch while the final feed rate desired is 2/10 of an inch per minute. The feed rate slows down from 30 inches per minute at one rate until it has dropped to 20 inches per minute. Thereafter it slows down at a more rapid rate until it has dropped from 20 inches per minute to 2/10 of an inch per minute.

Reference is now made to FIGURE 2 which shows an embodiment of the invention. Since the embodiment of the invention is to operate in conjunction with the apparatus described, for example in the patent to Rosenberg 2,833,941, and the application to Scuitto, Serial No. 610,730, now Patent 2,927,735, parts of these apparatus sufficient to enable the orientation of the invention therewith is shown in FIGURE 2. A brief explanation of these parts of the apparatus will be provided. However, for details of this explanation, one is referred to the aforesaid patents. For the purpose of obtaining a control pulse train for each coordinate axis whereby a desired path may be commanded of a machine tool cutting head with respect to a work piece mounted on the table, there is provided a control clock oscillator 20. This is an oscillator whose frequency may be varied over a range extending by way of example from one cycle per second to 700 kilocycles per second. The output of the clock pulse oscillator 20 is applied to a pulse shaping network 24 and thereafter to 3 divide counters respectively 26, 28 and 30. The counters respectively 26, 28 and 30 are respectively called the divide by X counter, the divide by Y counter and the divide by Z counter.

The divide counter for each coordinate axis is set to provide one output pulse in response to a predetermined number of clock pulses applied to its input. For the case of a straight line, this predetermined number of clock pulses is determined by the number of increments of motion commands required to move from the beginning to the end of a particular desired path along the particular coordinate. Thus, the divide by X counter has its count capacity set by an X divide factor control circuit 32. The Y counter similarly has its capacity set by a Y divide factor control 34 and the divide by Z counter has its capacity set by the Z divide factor control 36. These respective divide factor control circuits determine how many input pulses are applied to the associated counter before an output pulse is received therefrom. The divide factor control circuits are set using information which is either entered into the system directly from a keyboard or preferably from a punched paper tape which has been previously punched to provide the respective differences in distance along each coordinate axis between the beginning and ending of a path.

As shown and described in the Rosenberg Patent No. 2,833,941, different connections are employed for effectuating straight line path computations than for curve path computations between the outputs between the divide by X, divide by Y, and divide by Z counters respectively, 26, 28 and 30, and X sum counter 38, a Y sum counter 40 and a Z sum counter 42. A switching arrangement can interconnect the divide counter outputs to the respective sum counter inputs required for each different type of path. This switching network is represented by the rectangle 44 which is called an interconnection control network. For example for a straight line path the outputs from the divide by X and divide by Y counters are respectively connected to the inputs of Y sum counter and X sum counter. The divide by Z counter output is connected to the sum counter input of whichever of the other coordinates (X or Y) with which it is to be used for path generation. For a circle path the respective X, Y, Z divide counters 26, 28, 30 are connected to the input to the respective X, Y, Z sum counters 38, 40, 42. The X sum counter, Y sum counter and Z sum counter are reversible counters. When each one of them has received a sufficient number of pulses so that the sum represented by the count therein indicates that the number of pulses which have been received are sufficient in number to command the requisite motion to describe the desired path, a means (not shown) is provided to recognize this state and to either arrange for the next path data to be entered into the system or to turn off the system.

The pulses which are obtained from the respective divide by X counter 26, divide by Y counter 28, and divide by Z counter 30 besides being applied through the interconnection control network to the summing counters are also respectively applied to the recording circuits (not shown) to be recorded as three channels on tape, each having two tracks, one for recording command pulses signifying motion in one direction along an axis, the other track for recording command pulses signifying motion in the opposite direction along the same axis. The pulses are also respectively applied to three pulse rate discriminators 46, 48 and 50. As is described in detail in the application by Scuitto Serial No. 610,730, now Patent 2,927,735, the output pulses from the respective divide counters 26, 28, 30 during path generation occur at a certain pulse repetition rate. The pulse rate discriminator networks 46, 48 and 50 each provides an output comprising an analogue voltage whose amplitude represents the pulse rate. Details of the pulse rate discriminator circuitry are shown in FIGURE 3. The X and Y pulse rate discriminators 46, 48 apply these analogue voltage outputs to a vector adder 52. The output of the vector adder 52 is added in the vector adder 54 to the analogue voltage output of the Z pulse rate discriminator 50. The output of the vector adder 54 comprises a single resultant voltage whose amplitude is representative of the resultant speed at which a machine tool will be driven in response to the command pulses applied to the inputs of the X, Y and Z pulse rate discriminators. The output of the vector adder 54 is applied through an amplifier 56 in a manner to control the frequency of the control clock oscillator.

In the aforementioned application by Scuitto it was shown how by comparing this voltage with a reference which is preset into the system, which reference represents the desired speed of movement of a machine tool table the clock pulse oscillator frequency was varied so that the command pulse frequency rate was such as to maintain the table speed constant despite changes in slope and the like occurring along the path.

As thus far briefly described, the circuits are found described in the aforementioned patents and application.

In accordance with this invention, each pulse rate discriminator 46, 48, 50 has applied thereto not only the respective pulse outputs from the respective divide by X, divide by Y and divide by Z counters, but also has applied thereto the analogue outputs of a digital to analogue converter 60. The digital inputs to this digital to analogue converter are received from a feed rate counter 62. The feed rate counter 62 may comprise a decimal counter having three decades respectively, a unit decade 62A, a tens decade 62B, and a hundreds decade 62C. Such a decade counter is well known in the electronics art, as is also the circuit for the digital to analogue converter 60 which can provide an output voltage whose amplitude represents the count in the decade counter. The feed rate counter 62 originates the signals that determine the feed rate.

The feed rate counter has three general modes of operation. The first mode is called the presetting mode, and is one in which no slow start is desired for the machine tool. A number is then entered into a feed rate storage register 64 from a feed rate storage entry arrangement 66. This latter entry arrangement can comprise either a keyboard or a punched card or magnetic tape as desired. The feed rate storage register may comprise any well known register which is used for temporary information storage.

Next, a reset button 68 is pressed. This applies a reset potential from a source 70 to a divide flip flop circuit 72, to a direction flip flop circuit 74, and further to a preset or slow start flip flop circuit 76. Thereafter a scale set switch 78 is depressed which drives the present or slow start flip flop to its set condition. Thereafter slow start switch 80 is depressed applying potential from the source 82 to the AND gate 84. The set output of the preset or slow start flip flop 76 is also applied to the AND gate 84 thus enabling it to provide an output to an OR gate 88.

The output of the OR gate 88 is applied to an AND gate 90. A second required input to this AND gate 90 is an OR gate 92 which is connected to the reset output of flip flop 72. The third required energizing input to the AND gate 90 is received from the clock pulse oscillator 20 by way of the pulse shaping network 24.

The output from AND gate 90, consisting of pulses at the clock pulse oscillator frequency, is applied to the feed rate counter 62 to cause it to increase its count. The count in the feed rate counter 62 is compared with the count in the feed rate storage register 64 by a coincidence gate 96. Upon coincidence being attained coincidence gate 96 provides an output signal which is applied to reset the preset or slow start flip flop 76. As a result AND gate 84 is closed resulting in the closing of AND gate 90. Thus clock pulses are no longer applied to increase the count of the feed rate counter 62.

At this time the desired feed rate has been entered into the feed rate counter. Thereafter the apparatus may be employed in the manner for which it was designed, to provide the usual interpolation function for generating the required generating pulse trains. However, in accordance with this invention the pulse rate discriminators will be under control of the output of the digital to analogue converter in a manner to vary the frequency of the clock pulse oscillator so that the frequency of occurrence of the pulses in the pulse train are controlled to provide a resultant feed rate corresponding to the rate called for by the number of the feed rate counter.

A second mode of operation in accordance with this invention is called the slow start mode. With the slow start mode it is desired that the feed rate gradually increase at the beginning until it reaches its running feed rate as represented by the portion of the curve 10 in FIGURE 1 and holding this value until the slow down or next path. At the outset the desired running feed rate is entered via the feed rate storage entry 66 into the feed rate storage register 64. Next the reset button 68 is pressed, resetting all flip flops 72, 74, 76. After that, the button 78 is pressed, setting the preset or slow start flip flop 76.

The interpolation process is then started and clock pulses from the oscillator 20 are applied to the divide counters 26, 28, 30. The output from the divide counters, in addition to being applied to the previously described circuitry are also applied to an OR gate 100. The output of this OR gate 100 is applied to an AND gate 98 which receives a second, enabling, input from the set output of the preset or slow start flip flop 76. The output of the AND gate 98 is applied to an OR gate 88 the output from which is applied to AND gate 90. At this time AND gate 90 also receives the reset output of the divide flip flop 72 through OR gate 92, as well as the clock pulses from the pulse shaping network 24.

When the feed rate counter attains the same count as the value which is in the feed rate storage register, the coincidence gate 96 resets the preset or slow start flip flop whereby AND gate 98 is opened and further input to the feed rate counter is discontinued. As the feed rate counter increases its count, the output to the digital to analogue converter 60 controls the pulse rate discriminator so that the clock pulse oscillator frequency increases accordingly. As a result, the requisite pulse trains are generated at a gradually increasing rate whereby the feed rate increases gradually up to the optimum value.

It will be noted that the output of OR gate 88 is connected to flip flop 72 to successively set and reset it with each succeeding output. This feature is provided so that the feed rate is gradually increased at one speed up until a pre-determined value (corresponding to the feed rate counter having a count of 200), and thereafter the feed rate is increased at a slower speed. An OR gate 102 provides an output to OR gate 92 as long as the hundred's decade 62C of the feed rate counter has a count of less than 200. This is achieved by connecting the 0 and 1 outputs of the hundred's decade 62C to the input to OR gate 102. The output of the OR gate 102 is applied to OR gate 92 so that regardless of the set or reset condition of the divide flip flop 72, AND gate 90 can apply a clock pulse to the feed rate counter for every clock pulse applied to its input. When the count exceeds 200 then OR gate 92 only receives an output when the divide flip flop 72 is in its reset state. OR gate 88 output is a succession of pulses since the output of OR gate 100 which drives the AND gate 98, which in turn drives OR gate 88, comprises the pulse outputs of the X, Y and Z divide counters. Therefore, only the clock pulses occurring while the divide counter is reset are applied by AND gate 90 to the feed rate counter whereby it increases its count more slowly than when its count was less than 200. In an embodiment of the invention which was built, the count of 200 corresponds to 20 inches per second feed rate, and the count of 300 corresponded to 30 inches per second feed rate.

A third mode of operation of the embodiment of the invention is the slow down mode. To secure this type of operation which occurs during an interpolation operation of the system, it is necessary at the outset to determine the distance ΔS from the end of the path at which the slowdown of the feed rate is to occur. This can be done employing any one of the coordinate axes to provide the requisite information. By way of illustration, in an embodiment of the invention which was built the X axis was employed.

It will be recalled that the count indicated by the X sum counter 38 is a total of the control pulses which will subsequently be employed to direct motion along the X axis. The total number of the required pulses corresponds to the total number of motion increments required to execute the desired path length along the specified axis. The point along a path at which slow down is to commence can be established where desired.

Referring to FIGURE 2A, a slow down storage entry 104 is employed to enter into a slow down storage register 106, a value corresponding to the count in the sum counter (here selected as X sum counter 38, for exemplification) at which slowing down of the feed rate is desired to commence. The slow down storage entry, as well as the storage register may be identical with the feed rate storage entry 66 and the feed rate storage register 64. Entry of the desired running feed rate is made into the feed rate counter 62 by either the presetting mode of operation or the slow start mode of operation just previously described.

With the interpolation operation underway, when the X sum counter 38 achieves a count corresponding to that entered into the slow down storage register 106, the coincidence gates 108 sense this and apply an output to the direction flip-flop 74 (FIGURE 2B) which drives it from its reset to its set condition. When in its set condition it causes the feed rate counter to operate in a subtract mode in response to any input pulses. When in its reset condition, the direction flip-flop causes the feed rate counter to operate in its add mode in response to any input pulses. Thus the feed rate counter will reduce the count which is therein each time it receives an input pulse. Also, enabled at this time is an AND gate 110. This AND gate has one input connected to the set output of the direction flip-flop 74 and a second required enabling input connected to the output of the divide by X counter 26. The third input of the AND gate 110 is an inhibit input which is not present at this time. As a result, AND gate 110 can apply its output to OR gate 88 whereby AND gate 90 is enabled.

If the count in the feed rate counter exceeds 199 then the feed rate counter has its count diminished more slowly than when the count is less than 199 in view of the operation of OR gate 102 which, as previously described, is enabled to override the fact that flip-flop 72 is set, as long as counter 62 has a less than 200 count. This corresponds to the portion of curve 14 shown in FIGURE 1. The feed rate is diminished until a count of 2 is sensed corresponding to a feed rate of 2/10 of an inch per minute. This sensing function is provided by an AND gate 112. Enabling inputs for AND gate 112 are received from the two count output of the unit decade 62A, the zero output of the tens decade 62B and the zero output of the hundred's decade 62C. The output of the AND gate 112 is applied through an inverter 114 to inhibit AND gate 110 and prevent any output therefrom. As a result the feed rate counter no longer will have its count diminished and the feed rate will continue at 2/10 of an inch per minute until the interpolation operation is terminated. Thus over the slow down interval the clock pulse oscillator is controlled to provide clock pulses at a gradually diminishing frequency, as a result of which the control pulses being recorded will occur at a gradually diminishing frequency, whereby the machine tool being controlled by these control pulses will slow down.

A plurality of different circuits have been represented in the drawings as rectangles bearing circuit labels. These are representations of circuits which are well known in the electronic field and are purchaseable from various manufacturers of electronic circuits.

Reference is now made to FIGURE 3, which is a circuit diagram of a pulse rate discriminator suitable for use in this invention. Three of these are required as may be seen on reference to FIGURE 2A. The function which the pulse rate discriminator must perform is to receive a pulse train from one of the divide counters and to convert this into a direct-current voltage, the value of which is dependent upon the pulse-repetition frequency of the pulse train, as well as upon the analog voltage input received from the digital to analog converter. The pulse-train input from the divide counter is applied to the terminal 120, and an analog voltage representing the count received from the units decade 62A is applied to terminal 122. An analog voltage representing the value of the count in the tens decade 62B is applied to terminal 124. An analog count representing the value of the count in the hundred's decade 62C is applied to terminal 126. A fourth input terminal 128 has a clamping voltage applied thereto for reasons which will be described subsequently. This clamping voltage is removed when operation of the pulse-rate discriminator is desired.

The pulse-rate discriminator effectively comprises three components. The first of these is a Miller integrator circuit 130, the second is a flip flop circuit 132, and the third is a passive integrating circuit 134, used for smoothing purposes. The Miller integrator circuit includes four tubes 136, 138, 140, 142. The anode of tube 136 is coupled to the control grid of tube 138 through a capacitance. Tube 138 and tube 140 have their cathodes connected together and to a common cathode load 144. The control grid of tube 140 is connected through a resistor 146 to ground. Thus, effectively, tubes 138 and 140 are interconnected in a difference-amplifier fashion. Tube 140 will amplify any signal which exceeds the level set by the bias voltage established between its cathode and control grid. The output of tube 140 is direct-coupled through a resistor 148 to the control grid of tube 142. The cathode of tube 142 is connected through the integrating capacitor 150 back to the control grid of tube 136.

Part of the network in the feedback path between the cathode of tube 142 and the control grid of tube 136 includes resistors 152, 154, 156 and diodes 158 and 160. Resistor 152 is connected between the terminal 122 and control grid 136. Resistor 154, in series with diode of 158, is connected between terminal 124 and control grid 136. Resistor 156 in series with diode 160 is connected between terminal 126 and control grid 136. The reason for this selection of resistance values is to insure that the current introduced by each respective decade is proportional to its numerical value. Thus, a "five" applied to the terminal 122 would give five increments of current. A "two" applied to terminal 124 would give 20 increments of current, whereas a "one" input at terminal 126 would provide a 100 increments of current. Thereby the input value of current is maintained proportional to the commanded feed rate.

Flip flop 132 is conventional, and the details of its operation will not be described. It includes two tubes 162, 164. These tubes have their anodes and grids cross-connected in a well known fashion to provide a bistable state flip flop circuit. The flip flop circuit is biased so that whenever one of the tubes is driven into the conducting state its cathode rises up to ground potential. The non-conducting one of the tubes has its cathode at a negative potential. Further, the grid of a conducting tube is at ground potential and of a non-conducting tube is at a negative potential. The input to terminal 128 clamps the control grid of tube 162 so that the flip flop circuit cannot be operated, no matter what other inputs are being applied to it or to the Miller integrator. Upon the application of a pulse to terminal 120 (negative-going) tube 162, which heretofore has been held conductive, is rendered nonconductive. This causes the potential of the cathode of tube 162 to become negative. The cathode of tube 162 is coupled to the control grid of tube 136, as well as to the resistor 152 and diodes 158 and 160 through a diode 166. When tube 162 is nonconductive, then its cathode is at ground potential with the result that diode 166 serves to clamp the control grid of tube 136 and prevent operation of the Miller integrator. However, when tube 162 is rendered nonconductive in response to the motion pulse, the cathode goes negative and the diode 166 will no longer clamp the control grid of tube 136 to ground. The Miller integrator can then respond to inputs applied to its terminals 122 through 126. In response thereto, a ramp voltage is generated, the slope of which is dependent upon the amplitude of the input current. This ramp voltage is fed back to the input through the capacitor 159. Output from Miller integrator, comprising a positive-going ramp voltage, is derived from the cathode of tube 142 and applied through a diode 168 to the control grid of tube 162. When this ramp voltage attains a sufficiently high level, the tube 162 will be rendered conductive, whereby the flip flop 132 is reset.

The operation of the circuit should now be apparent. In response to a motion pulse, the flip flop 132 is set and the interval required until it will become reset is determined by the amplitude of the analog voltage being received from the digital-to-analog converter 60, which is applied to the Miller integrator. Output is taken from the anode of tube 164 and connected to the output circuit 134 and output terminal 170. The signal derived from the anode of tube 164 will consist of a pulse train, the width of the individual pulses being determined by the rise time of the Miller integrator. This is filtered through the circuit 134 so that at the terminal 170 there is a slowly varying D.C. voltage. This D.C. voltage is proportional to the pulse rate and inversely proportional to the numerical value in the feed-rate counter. A necessary requisite to the high-speed operation of the circuit is a diode 172 which is connected between the cathode of tube 164 and the control grid of tube 138. This diode eliminates the long retrace time which would normally occur with the Miller integrator. It clamps the control grid of tube 138 to the negative potential of the cathode of tube 164 when the flip flop is reset, whereby the potential of cross capacitor 150 is rapidly brought back to the starting condition.

If a high feed rate is commanded, the input current which is received by the control grid of tube 136, will be large, and, as a result, the slope of the ramp voltage will also be steep. The width of the pulse received by the output circuit will be narrow. In order that the voltage at terminal 170 be held at its constant value, the rate of pulses entering will also necessarily have to be high. For a low feed rate, the current applied to the control grid of tube 136 will be low, and the slope of the ramp voltage developed by the Miller integrator circuit will be very gradual. Thus the length of the pulse applied to the output circuit will be long. Therefore, to maintain a constant voltage at the output terminal, the input frequency of the command pulses must be low. In order that this servo may operate stably the ratio of on-time of the flip flop 132 to its off-time is maintained somewhere between 1 to 5 or 1 to 6. This is necessary to take care of asymmetrical spacing of the motion pulses applied to terminal 120 and transients in the feed rate developed during slow-start and slow-down, and setting of the feed rate initially.

There has been accordingly described and shown herein a novel, useful, and unique circuit for establishing feed-rate control of a machine tool by controlling the frequency of oscillation of a clock-pulse oscillator from the output of which motion command pulses are generated.

I claim:

1. In apparatus of the type wherein separate pulse trains for separately commanding motion of apparatus along separate coordinate axes are derived from a controllable frequency oscillator, apparatus for determining the rate of the resultant motion obtained in response to said commanded motions by controlling the frequency of said controllable frequency oscillator comprising a counter, means for entering into said counter, a count representative of a desired rate of resultant motion, means to which said counter is connected for converting said count into an analog voltage representative of said count, a pulse rate discriminator means for each axis for generating a voltage directly proportional to an input pulse rate and inversely proportional to an input voltage, means for applying to each of said pulse rate discriminator means a different one of said separate pulse trains and said analog voltage, means for combining the outputs from each of said pulse rate discriminator means to obtain a resultant voltage, and means for applying said resultant voltage to said controllable frequency oscillator to control the frequency of oscillations therewith.

2. In apparatus of the type wherein separate pulse trains for separately commanding motion of apparatus along separate coordinate axes are derived from a controllable frequency oscillator, apparatus for determining the rate of the resultant motion obtained in response to said commanded motions by controlling the frequency of said controllable frequency oscillator comprising a reversible counter, means for entering into said counter a count representative of a desired rate of resultant motion, a counter to which the pulses from one of said pulse trains are applied for being counted, means for detecting when said counter has attained a predetermined count and for providing a coincidence output indicative thereof, an inactive gate means for applying output to said reversible counter from said controllable frequency oscillator to reduce the count in said counter, means for applying said coincidence output to said inactive gate means to render it active, means to which said reversible counter is connected for converting its count output into a representative analog voltage, a pulse rate discriminator means for each axis for generating a voltage directly proportional to an input pulse rate and inversely proportional to an input voltage, means for applying to each of said pulse rate discriminator means a different one of said separate pulse trains and said analog voltage, means for combining the outputs from each of said pulse rate discriminator means to obtain a resultant voltage, and means for applying said resultant voltage to said controllable frequency oscillator to control the frequency of oscillations therewith.

3. In apparatus as recited in claim 2 wherein said means for applying output to said counter from said controllable oscillator to reduce the count in said counter includes gate means having its output connected to said reversible counter and its input connected to receive said controllable oscillator output, flip-flop means to which pulses from all of said pulse trains are applied to open said gate means responsive to every other one of said pulses to thereby reduce the rate of said count decrease, and means for overriding the operation of said flip-flop means and for maintaining said gate means continuously open responsive to the count in said reversible counter being less than a predetermined value.

4. In apparatus as recited in claim 3 wherein there is included means to sense when said reversible counter is reduced to a predetermined minimum value and means to apply an output from said means to sense to close said gate means to prevent further reduction in the count of said reversible counter.

5. In apparatus of the type wherein separate pulse trains for separately commanding motion of apparatus along separate coordinate axes are derived from a controllable frequency oscillator, apparatus for determining the rate of the resultant motion obtained in response to said commanded motions by controlling the frequency of said controllable frequency oscillator comprising, a reversible counter, a first register means for entering into said first register a count representative of a desired rate of resultant motion, closed gate means having its input connected to said controllable frequency oscillator output and its output connected to said reversible counter input, a direction flip-flop circuit having two stable states, means for applying output from said direction flip-flop circuit when in one stable state to control said reversible counter to count up in response to input, means for applying output from said direction flip-flop circuit when in the other stable state to control said reversible counter to count down in response to input, means for initially setting said direction flip-flop circuit to its one stable state, a start flip-flop circuit, a divide flip-flop circuit, both said flip-flop circuits having two stable states, means for applying the outputs from both said flip-flop circuits when in one of their stable states to said closed gate means to cause it to open whereby said counter will count up, means for successively driving said divide flip-flop circuit from one to the other stable state responsive to output from said closed gate means, means responsive to said reversible counter having a count less than a predetermined value to override the effect of said divide flip-flop circuit being in its other stable state whereby said closed gate remains open, means for comparing the count in said reversible counter with that in said first register and providing a first coincidence output when they are identical, means for applying said coincidence output to drive said start flip-flop circuit to its other stable state to thereby close said closed gate and terminate further count up by said reversible counter, a counter to which the pulses from one of said pulse trains are applied, means for detecting when said counter has attained a predetermined count and for providing a second coincidence output indicative thereof, means for applying said second coincidence output to said direction flip-flop to drive it to its other stable state to thereby control said reversible counter to count down in response to input, means to open said closed gate responsive to said direction flip-flop being in its other stable state, means responsive to said reversible counter attaining a predetermined minimum count to close said closed gate means, means to which said reversible counter is connected to convert its count output into a representative analog voltage, a pulse rate discriminator means for each axis for generating a voltage directly proportional to an input pulse rate and inversely proportional to an input voltage, means for applying to each of said pulse rate discriminator means a different one of said separate pulse trains and said analog voltage, means for combining the outputs from each of said pulse rate discriminator means to obtain a resultant voltage, and means for applying said resultant voltage to said controllable frequency oscillator to control the frequency of oscillation therewith.

6. In apparatus of the type wherein separate pulse trains for separately commanding motion of apparatus along separate coordinate axes are derived from a controllable frequency oscillator, apparatus for determining the rate of the resultant motion obtained in response to said commanded motions by controlling the frequency of said controllable frequency oscillator comprising: a counter; means for entering a count representative of a desired rate of resultant motion into said counter; means to which said counter is connected for converting said count into an analog voltage representative of said count; a pulse rate discriminator means for each axis for generating a voltage directly proportional to an input pulse rate and inversely proportional to an input voltage; means for applying to each of said pulse rate discriminator means a different one of said separate pulse trains and said analog voltage; each said pulse rate discriminator means including an integrating circuit, a flip-flop circuit having two stable states, means for driving said flip-flop circuit to one of its stable states responsive to each pulse in a pulse train, means for applying said analog voltage to said integrating circuit, means coupling said integrating circuit to said flip-flop circuit for driving said flip-flop circuit to the other of its stable states when said integrating circuit output attains a predetermined value, means coupled between said flip-flop circuit and said integrating circuit for holding said integrating circuit inoperative when said flip-flop circuit is in its other stable state, and means to derive an output from said flip-flop circuit; means for combining the outputs from each of said pulse rate discriminator means to obtain a resultant voltage; and means for applying said resultant voltage to said controllable frequency oscillator to control the frequency of oscillations therewith.

7. In apparatus of the type wherein separate pulse trains for separately commanding motion of apparatus along separate coordinate axes are derived from a controllable frequency oscillator, apparatus for determining the rate of the resultant motion obtained in response to said commanded motions by controlling the frequency of said controllable frequency oscillator comprising: a counter; means for entering a count representative of a desired rate of resultant motion into said counter; said means for entering a count representative of said desired rate of resultant motion into said counter including means for applying an output from said controllable frequency oscillator into said counter to be counted at the commencement of the derivation of said separate pulse trains from said controllable frequency oscillator, means for sensing when the count in said counter attains the desired count and providing an output signal indicative thereof, and means responsive to said output signal for interrupting further application of said output from said controllable frequency oscillator into said counter; means to which said counter is connected for converting said count into an analog voltage representative of said count; a pulse rate discriminator means for each axis for generating a voltage directly proportional to an input pulse rate and inversely proportional to an input voltage; means for applying to each of said pulse rate discriminator means a different one of said separate pulse trains and said analog voltage; means for combining the outputs from each of said pulse rate discriminator means to obtain a resultant voltage; and means for applying said resultant voltage to said controllable frequency oscillator to control the frequency of oscillations therewith.

8. In apparatus of the type wherein separate pulse trains for separately commanding motion of apparatus along separate coordinate axes are derived from a controllable frequency oscillator, apparatus for determining the rate of the resultant motion obtained in response to said commanded motions by controlling the frequency of said controllable frequency oscillator comprising: a counter, said counter being reversible; means for entering a count representative of a desired rate of resultant motion into said counter; inactive means for applying an output from said controllable frequency oscillator to said counter to reduce the count in said counter; means for actuating said inactive means upon the occurrence of a predetermined pulse in one of said pulse trains; means to which said counter is connected for converting said count into an analog voltage representative of said count; a pulse rate discriminator means for each axis for generating a voltage directly proportional to an input pulse rate and inversely proportional to an input voltage; means for applying to each of said pulse rate discriminator means a different one of said separate pulse trains and said analog voltage; means for combining the outputs from each of said pulse rate discriminator means to obtain a resultant voltage; and means for applying said resultant voltage to said controllable frequency oscillator to control the frequency of oscillations therewith.

References Cited in the file of this patent

UNITED STATES PATENTS

| | | |
|---|---|---|
| 2,867,724 | Olson | Jan. 6, 1959 |
| 2,927,735 | Scuitto | Mar. 8, 1960 |